United States Patent Office
2,936,313
Patented May 10, 1960

2,936,313

PREPARATION OF STEROIDAL 21-PHOSPHATE DERIVATIVES

Joseph Elks, London, and Gordon Hanley Phillipps, Greenford, England, assignors to Glaxo Laboratories Limited, Greenford, England, a British company No Drawing. Application November 18, 1958
Serial No. 774,578

Claims priority, application Great Britain
November 19, 1957

20 Claims. (Cl. 260—397.45)

This invention is concerned with improvements in or relating to the preparation of steroid derivatives.

It has been shown that the 21-phosphate primary esters of cortical steroids such as cortisone, hydrocortisone, prednisone and prednisolone have valuable properties not possessed by the parent steroid or their 21-acetate and similar acyloxy derivatives. In particular these 21-phosphate primary esters have the property (generally in the form of salts, e.g. of alkali metal), of being water-soluble thus enabling the steroid to be administered in aqueous solution.

It is the object of the present invention to provide an improved method for the production of 21-phosphates, including secondary and tertiary phosphates, of compounds of the pregnane and allopregnane series. For brevity we use the term "compounds of the pregnane and allopregnane series" not only to designate compounds in which the ring systems are saturated but also to include compounds having ring unsaturation such as pregnenes, allopregnenes, pregnadienes, etc.

It has now been found that these phosphates can conveniently be prepared by reacting the corresponding 21-halogeno or 21-sulphonyloxy compound with a phosphoric acid (which may be partially esterified if it is desired to obtain a secondary or tertiary 21-phosphate), in the presence of an organic base, the reaction being conducted in solution in an inert solvent medium, preferably of high dielectric constant. Whilst the process according to the invention is suitable for the production of primary, secondary and tertiary phosphate esters it is particularly advantageous for use in the production of primary and secondary esters.

According to the invention, therefore, there is provided a process for the production of a 21-phosphate which may, if desired, be secondary or tertiary, of a compound of the pregnane or allopregnane series which comprises reacting the corresponding steroid 21-halide of 21-sulphonyloxy compound with a phosphoric acid, preferably orthophosphoric acid or a partially esterified phosphoric acid in the presence of an organic base which has a pKa in water of at least 7. The reaction is preferably conducted in solution in an inert solvent medium.

While the resultant phosphate has a free acidic hydroxyl group (i.e. in the case of primary and secondary phosphates) the compound may be recovered as the free acid or as a salt thereof, e.g. alkali metal, alkaline earth metal or organic base salt.

The process according to the invention is of particular application in the preparation of the 21-phosphate esters of steroids having a keto group in the 20-position and especially compounds having adreno-cortical activity, e.g. cortisone, prednisone, cortisol and prednisolone, as well as other analogues thereof such as the corresponding 6- and 9-halo compounds, 2- and 6-methyl compounds and/or 16-hydroxy, 16-acyloxy or 16-alkyl compounds.

However the formation of 21-phosphate esters of steroids other than the adreno-cortical hormones may be of value, and for example by the process according to the invention one can readily prepare phosphate esters of steroidal anaesthetics e.g. 21-hydroxy-pregnane-3:20-dione.

Thus, one may use as starting material a steroid 21-halide or 21-sulphonyloxy compound having the general formula

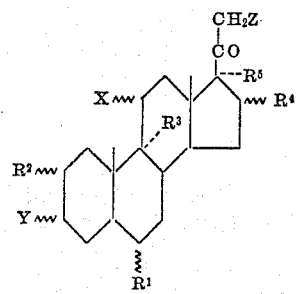

where

Z is a halogen atom or a sulphonyloxy group;
$R^1$ is a hydrogen or halogen atom or an alkyl (e.g. methyl, ethyl etc.) group;
$R^2$ is a hydrogen atom or an alkyl (e.g. methyl, ethyl etc.) group;
$R^3$ is a hydrogen or a halogen atom;
$R^4$ is a hydrogen or a hydroxy, acyloxy or alkyl group;
$R^5$ is a hydrogen or a hydroxy or acyloxy group;
X is a hydrogen atom or a hydroxy group or a ketonic oxygen atom, and
Y is a hydroxy or acyloxy group or a ketonic oxygen atom, and the corresponding $\Delta^1$, $\Delta^4$, $\Delta^{1:4}$ and $\Delta^5$ compounds, the hydrogen atom, if any, in the 5-position having the $\alpha$- or $\beta$-configuration.

The process according to the invention may be used in the production of steroids having adreno-cortical or other physiological activity or in the production of inactive precursors of such steroids which may be converted to an active steroid 21-phosphate by suitable chemical or biochemical means after the introduction of the 21-phosphate group. Thus, for example, one may start from a 21-halogeno or 21-alkyl, aralkyl- or aryl-sulphonyloxy-11$\beta$:17$\alpha$-dihydroxy-pregn-4-ene-3:20-dione and obtain the 21-phosphate directly therefrom or, alternatively, one may use as starting material a 21-halo or 21-alkyl-, aralkyl- or aryl-sulphonyloxy-3$\beta$:17$\alpha$-dihydroxy-5$\alpha$-pregna-11:20-dione such as 21-bromo-3$\beta$:17$\alpha$-dihydroxy-5$\alpha$-pregna-11:20-dione, convert this to the corresponding 21-phosphate and then by suitable chemical or biochemical means introduce $\Delta^4$ or $\Delta^{1:4}$ unsaturation and oxidise the 3-hydroxy group to confer the desired activity.

The phosphoric acid is advantageously used in a quantity in excess of that required to react with the steroid 21-halide or -sulphonate. Thus it is convenient to use between 4 and 16 molecular equivalents of the acid per mol of the steroid. By varying the ratio of acid to steroid, compounds of different structure may be obtained. Thus when using a relatively high ratio of acid to steroid (e.g. 15:1) the process according to the invention yields a product which is predominantly a mono steroid phosphate. The use of lower proportions of acid to steroid (e.g. 4:1 or less) gives rise to increasing proportions of bis-steroid phosphates. If the amount of the phosphoric acid used is increased to above 16 molecular equivalents per mol of steroid, the subsequent isolation and purification of the product may become more difficult. Where mono-phosphate esters are required we find it convenient to use about 15 molecular equivalents of acid per mol of steroid.

As stated above, the phosphoric acid may be partially esterified if one desires to obtain a secondary or tertiary phosphate. Thus in the process according to the invention one may use phosphoric acid esters of the general formula $$R^6R^7HPO_4$$

where $R^6$ is a hydrogen atom or an aliphatic or aromatic group and $R^7$ is an aliphatic or aromatic group.

$R^6$ is preferably a hydrogen atom or an alkyl, hydroxy-alkyl, aryl or aralkyl or phenacyl group, and $R^7$ is preferably an alkyl, hydroxylalkyl, aryl, aralkyl or phenacyl group. The phosphoric acid may be used in a partially dehydrated form.

Certain of the secondary 21-phosphates prepared according to the present process form the subject of applicants' co-pending application Serial No. 774,580, filed on even date.

As stated above the organic base used in the present process must have a pKa in water of at least 7. In general, alkylamines especially trialkylamines are preferred, especially lower alkylamines, the volatility of which simplifies removal of the amine after the reaction is complete. Examples of bases which may be conveniently used in the present process are: isopropylamine, diethylamine, triethylamine, tri-n-propylamine, piperidine, N-methylmorpholine, N-ethylpiperidine and triethanolamine.

The base is conveniently used in an amount of 1.0–2.0 mols per mol of phosphoric acid used.

Instead of using a separate base and a separate phosphoric acid or ester thereof one may use, if desired, a preformed salt of the desired base with the phosphoric acid or ester thereof.

The process according to the invention is preferably conducted in solution in an organic solvent. In choosing a suitable solvent, a solvent must hence be selected in which the phosphate salt of the base is soluble and for this purpose it will generally be necessary to use a solvent of high dielectric content, preferably above 15 and advantageously above 30. The solubility of the base phosphates in various solvents does however vary and preliminary experiment should be conducted to select a suitable solvent and the quantity in which it is used for any particular reactants. Suitable solvents will generally be found among the following, namely, acetonitrile, methanol, N:N-dimethylformamide and dimethylsulphoxide.

The process according to the invention is conveniently carried out at temperatures within the range of 50 to 130° C.

The phosphate products obtained according to the invention may be recovered from the reaction mixture in any convenient way. Thus, for example, in the case of primary and secondary phosphates, the solvent may be removed by distillation and the aqueous solution of the product passed through a cation exchange column in the H+ form to give a solution of the steroid hydrogen phosphate. Salts of the steroid phosphate may be obtained by neutralisation of the steroid hydrogen phosphate, obtained as described above, or by passing a solution of the crude reaction product through a cation exchange resin in the salt form. Where a volatile base is used in the reaction advantage should be taken of its volatility and an alternative and simplified method of isolating the steroid phosphate, which avoids the use of ion exchange resins, may be employed in which the reaction product after evaporation of the solvent is dissolved in methanol and the solution treated with a methanolic solution of an alkali metal hydroxide. Precipitated inorganic phosphate is filtered off and the solution is evaporated to dryness to give the crude alkali metal salt of the steroid phosphate which may be purified by crystallisation.

In order that the invention may be well understood, the following examples are given by way of illustration only. The temperatures were measured in degrees centigrade.

EXAMPLE 1

*Hydrocortisone 21-sodium phosphate*

21-iodo-11β:17α-dihydroxypregn - 4 - ene - 3:20-dione (5.0 g.) in pure acetonitrile (125 ml.) was mixed with a solution of 90% phosphoric acid (2.5 ml.) and triethylamine (7.5 ml.) in acetonitrile (125 ml.) and boiled under reflux for 4 hours. The solvent was removed in vacuo and the residue, dissolved in ethanol (20 ml.) and water (80 ml.), was passed down a column of Zeo-Karb 225 (H+ form) (60 g.) made up in 20% alcohol. Elution was continued with 20% alcohol (50 ml.), 50% alcohol (50 ml.) and alcohol (150 ml). The eluate was at first cloudy, but by the end of the elution it was clear and non-acidic.

The eluate was titrated to pH 7 with 0.972 NNaOH (63 ml.). Removal of solvent left a gum, which was boiled with methanol (400 ml.) for 20 minutes. The solid insoluble inorganic phosphate was filtered off and washed with methanol (200 ml.). The slightly cloudy filtrate was filtered again, and evaporated to dryness in vacuo. The residual gum dissolved readily in water (40 ml.) and on addition of acetone (600 ml.) to the solution a mixture of sodium salts of hydrocortisone 21-phosphate separated as a white solid. This was collected after 2 days, washed with acetone and dried at 100° C./0.1 mm./ 2 hr. to constant weight. Yield 4.45 g., $$\lambda^{H_2O}_{max.}\ 247\ m\mu,\ E^{1\%}_{1\,cm.}\ 296.5$$

EXAMPLE 2

*Prednisolone 21-sodium phosphate*

Crude 21 - iodo - 11β:17α - dihydroxypregna-1:4-diene-3:20-dione (5.0 g.) was treated as in Example 1.

The final precipitation from water (40 ml.) with acetone (500 ml.) gave a resinous precipitate, which after trituration with acetone (200 ml.) gave a pale yellow solid. After drying to constant weight (3.18 g.) at 100° C./0.1 mm./2 hr. a mixture of sodium salts of prednisolone 21-phosphate having $$\lambda^{H_2O}_{max.}\ 247\ m\mu,\ E^{1\%}_{1\,cm.}$$

273 was obtained.

EXAMPLE 3

*Hydrocortisone 21-phosphate*

11β:17α-dihydroxy-21-iodopregn-4-ene-3:20-dione (100 mg.; 1 mole) was added to a mixture of a base (5 moles) and 90% phosphoric acid (4 moles) in a solvent (5 ml.) (either acetonitrile (AN), dimethylsulphoxide (DMSO) or dimethylacetamide (DMA)) and heated at either the boiling point or 100° C., whichever was the lower, for 4 hours.

The reaction mixture was examined by descending paper chromatography on Whatman No. 54 paper, using isopropanol-ammonia-water as the solvent system. The presence of hydrocortisone phosphate, R_F ca. 0.45, was shown by ultraviolet photography of the untreated paper, and by treatment with the phosphate-detecting spray of ammonium molybdate-perchloric acid-hydrochloric acid. The following Table I shows combinations of bases and solvents which resulted in formation of hydrocortisone 21-phosphate.

TABLE I

| Type of base | Base | Solvent | Solubility of amine phosphate | pKa |
|---|---|---|---|---|
| Primary amines | iso-Propylamine | DMSO | Soluble | 10.7 |
| Secondary amines | Piperidine | DMSO | do | 11.12 |
| | Diethylamine | DMSO | do | 11.0 |
| | Dibenzylamine | DMSO | do | |
| Tertiary amines | Triethylamine | AN | do | 10.7 |
| | do | DMSO | do | 10.7 |
| | do | DMA | do | 10.7 |
| | Tri-n-propylamine | AN | do | 10.7 |
| | N-ethyl piperidine | DMSO | do | |
| | N-methyl morpholine | DMSO | do | 10.41 |
| | Triethanolamine | DMSO | do | 7.77 |

EXAMPLE 4

*Hydrocortisone 21-phosphate*

11β:17α-dihydroxy-21-iodopregn-4-ene-3:20-dione (100 mg., 1 mole) was added to a mixture of triethylamine (4.8 moles) and 90% phosphoric acid (4 moles) in various solvents (5 ml.), and heated for 4 hours. Hydrocortisone 21-phosphate was detected as in the preceding example. Table II describes the solvents which were used and the reaction rates found.

TABLE II

| Solvent | Temp., °C. | Dielectric constant at 20° C. | Reaction Rate |
|---|---|---|---|
| Dimethylsulphoxide | 100 | 45 | Fast. |
| Ethylene glycol | 100 | 41 | Slow. |
| Acetonitrile | 82 | 39 | Fast. |
| Do | 65 | 39 | Slow. |
| 10% H₂O in acetonitrile | ca. 82 | | Medium. |
| Dimethylacetamide | 100 | 37 | Fast. |
| Dimethylformamide | 100 | 35 | Medium. |
| Methanol | 65 | 33 | Slow. |
| Ethanol | 78.5 | 26 | Slow. |
| sec. Butanol | 99.5 | 19 | Very slow. |
| N-Formylmorpholine | 100 | 15.5 | Medium. |

EXAMPLE 5

*Hydrocortisone 21-sodium phosphate*

FROM HYDROCORTISONE 21-METHANESULPHONATE

Hydrocortisone 21-methanesulphonate (1.0 g.) was added to a previously prepared solution of 90% phosphoric acid (0.5 ml.) and triethylamine (1.5 ml.) in acetonitrile (50 ml.) and boiled under reflux for 22 hours. Isolation as in Example 1 gave a mixture (0.67 g.) of hydrocortisone 21-sodium phosphate and sodium methanesulphonate.

EXAMPLE 6

*Hydrocortisone phosphate*

(a) FROM 21-CHLORO-11β:17α-DIHYDROXYPREGN-4-ENE-3:20-DIONE

The 21-chloro compound was reacted with triethylammonium phosphate in dimethylacetamide, as in Example 4, to give hydrocortisone phosphate, detected by paper chromatography.

(b) FROM 21-BROMO-11β:17α-DIHYDROXYPREGN-4-ENE-3:20-DIONE

The 21-bromo compound was reacted with triethylammonium phosphate in acetonitrile, as in Example 4, to give hydrocortisone phosphate, detected by paper chromatography.

EXAMPLE 7

*3β:17α:21 - trihydroxy - 5α - pregnane - 11:20 - dione 21 - disodium phosphate*

21 - bromo - 3β:17α - dihydroxy - 5α - pregnane - 11:20 - dione (5.0 g.) was added to a mixture of 90% phosphoric acid (2.5 ml.) and triethylamine (7.5 ml.) in acetonitrile (250 ml.). During 15 minutes at the boiling point most of the bromo compound had dissolved, and a fine crystalline precipitate had started to separate. After 8 hr. at the boiling point the mixture was cooled, and the solid (6.0 g.) filtered off and washed with a little acetonitrile. It had $[\alpha]_D + 34°$ (in 1:1 EtOH:H₂O), contained 6.5% of inorganic PO₄, and was free from bromide ion.

The solid (3.0 g.) in 1:1 aqueous alcohol was passed down a column of Zeo-Karb 225 (H⁺ form, 20 g.), and the eluate titrated with sodium hydroxide to the pH of the disodium salt. The solvent was removed in vacuo, and the residue extracted with boiling methanol (150 ml.). The methanol extract was evaporated to dryness, and the residue reprecipitated from water (30 ml.) with acetone (400 ml.) as a white solid (1.99 g.), M.P. 215–218° (dec.), $[\alpha]_D + 29.4°$ (c, 0.97 in water; pH 8.4). Recrystallisation of 1.0 g. from water (50 ml.) and acetone (150 ml.) gave the 21-disodium phosphate as lustrous plates (0.76 g.) M.P. 215–218° then 265–268° (with dec.), $[\alpha]_D + 28.8°$ (c, 0.9 in H₂O). (Found: C, 49.4; H, 7.1; P, 6.6. $C_{21}H_{32}O_8PNa_2 \cdot H_2O$ requires C, 49.7; H, 6.75; P, 6.1%.)

EXAMPLE 8

(a) *Prednisolene 21-disodium phosphate*

Acetonitrile (50.0 ml.) containing phosphoric acid (90%; 1.0 ml.) was treated with triethylamine (3.0 ml.) and the solution added to 11β:17α-dihydroxy-21-iodo pregna-1:4-diene-3:20-dione (1.0 g.; powdered). The mixture was refluxed for 2.75 hours and the solvent was then evaporated under reduced pressure to give a yellow oil. The oil was taken up in methanol (25 ml.) and titrated to pH 10.9 with sodium hydroxide in methanol (N) using a pH meter. The precipitate was filtered off and the filtrate evaporated to a gum under reduced pressure. The gum was taken up in methanol (5 ml.), filtered through filter paper and acetone (100 ml.) was added to the filtrate. The precipitate was filtered off, washed with acetone and dried at 100° C./1 mm. for 0.75 hour giving a pale yellow solid, prednisolone disodium phosphate (0.74 g.), which was completely soluble in water, $$\lambda \text{ max. } 247 \text{ m}\mu \left(E^{1\%}_{1\text{ cm.}} 315\right)$$

The infra red spectrum showed the characteristics of prednisolone disodium phosphate.

(b) *Prednisolone 21-di-(cyclohexylammonium) phosphate*

Prednisolone 21-disodium phosphate (500 mg.) in water (3 ml.) was mixed with a solution of cyclohexylamine hydrochloride (2.0 g.) in water (3 ml.), and the crystals (493 mg.) which separated were filtered off, washed with a little water and dried. They had M.P. 190–205° (dec.), $$\lambda^{H_2O}_{\text{max.}} 247 \text{ m}\mu, E^{1\%}_{1\text{ cm.}} 230$$

and on crystallisation from aqueous acetone gave prednisolone 21-di-(cyclohexylammonium) phosphate (182 mg.), M.P. 190–205° (dec.), $[\alpha]_D + 83°$ (c, 1.15 in H₂O).

(Found: C, 59.2; H, 8.8; N, 4.2; P, 5.0. $C_{33}H_{55}O_8NP \cdot 2H_2O$ requires C, 58.2; H, 8.7; N, 4.2; P, 4.6%). λ max. (in H₂O) 247 mμ, $$E^{1\%}_{1\text{ cm.}} 236.5$$

(c) *Prednisolone 21-dihydrogen phosphate*

Prednisolone 21-disodium phosphate (250 mg.) in water (2 ml.) was acidified with 2 N hydrochloric acid (2 ml.) and extracted with ethyl acetate (5×8 ml.). The extract was washed with a little water and the water washed with ethyl acetate. The combined ethyl acetate extract was dried over magnesium sulphate, when it went cloudy due to separation of steroid. The magnesium sulphate was filtered off and washed with acetone, and the filtrate evaporated to dryness in vacuo, when prednisolone 21-dihydrogen phosphate separated as an amorphous powder.

(Found: C, 53.3; H, 7.6; P, 6.2. $C_{21}H_{29}O_8P \cdot 2H_2O$ requires C, 52.9; H, 7.0; P, 6.5%), λ max. (in aq. $NaHCO_3$) 247.5 mμ, $E^{1\%}_{1\,cm.}$ 321

EXAMPLE 9

Hydrocortisone 21-cyclohexylammonium benzyl phosphate

Sodium benzyl hydrogen phosphate (1.0 g.) was converted into the acid by ion exchange, and then into the triethylammonium salt with triethylamine (1.5 ml.). This was suspended in acetonitrile (25 ml.) and 21-iodo-11β: 17α-dihydroxypregn-4-ene-3:20-dione. (0.55 g.) was added. After 6 hr. at the boiling point the solvent was removed in vacuo and the residue taken up in water and filtered. The filtrate on mixing with cyclohexylamine hydrochloride (1.5 g.) in water gave a gummy precipitate, which crystallised on heating at 100°. After cooling, the crystals (0.87 g.) of M.P. 190–200° (dec.), were filtered off, washed with water and dried. Crystallisation from ca. 50% aqueous alcohol gave a first crop (0.17 g.) of hydrocortisone 21-cyclohexylammonium benzyl phosphate, M.P. 190–195° (dec.), $[α]_D$+99.5 ($CH_3OH$), λ max. (in EtOH) 242.5 mμ, $E^{1\%}_{1\,cm.}$ 280

EXAMPLE 10

Hydrocortisone 21-dibenzyl phosphate 21-iodo-11β:17α-dihydroxypregn-4-ene-3:20-dione (0.5 g.) was added to a mixture of dibenzyl hydrogen phosphate (0.5 g.) and triethylamine (0.25 ml.) in acetonitrile (20 ml.) and the mixture refluxed for 3 hours. The solvent was removed in vacuo, and the residual orange oil taken up in ethyl acetate. The solution was washed with dilute hydrochloric acid, aqueous sodium hydrogen carbonate and dilute aqueous sodium metabisulphite. Removal of solvent left a brown gum, which on crystallisation from ethyl acetate gave crude hydrocortisone dibenzyl phosphate (233 mg.) M.P. 170–172° (dec.), $[α]_D$+114.5° (in $CHCl_3$), λ max. (in EtOH) 240 mμ, $E^{1\%}_{1\,cm.}$ 378

EXAMPLE 11

Prednisone 21-disodium phosphate

17α-hydroxy-21-iodopregna-1:4-diene-3:11:20-trione (3.0 g.) was added to a mixture of 90% phosphoric acid (10.5 g.) and triethylamine (16 ml.) in methanol (10.5 ml.) and after heating on a steam bath for 2 hours under reflux methanol (50 ml.) was added. The solution was cooled to 35°, and a solution of sodium hydroxide (11 ml. of 47% w./w.) in water (7.8 ml.) and methanol (16.2 ml.) was added, keeping the temperature below 40°. After two hours at room temperature the suspension was filtered and the solid washed with 9:1 methanol-water (75 ml.), and the combined filtrates evaporated in vacuo to low bulk, diluted to 30 ml. with water and titrated with sodium hydroxide to pH 8.6. Acetone (500 ml.) was added and the solvent removed in vacuo to ca. 5 ml. and acetone (500 ml.) again added. The precipitate was collected by filtration, washed with acetone and dried to give prednisone 21-disodium phosphate (2.54 g.) as a tetrahydrate, M.P. 188–189° (dec.), $[α]_D$+132° (c, 0.8 in $H_2O$).

(Found: C, 45.9; H, 6.1; P, 5.8. $C_{21}H_{25}O_8PNa_2 \cdot 4H_2O$ requires C, 45.5; H, 6.0; P, 5.6%.)

EXAMPLE 12

(a) Di(hydrocortisone 21-)cyclohexylammonium phosphate

11β:17α-dihydroxy-21-iodopregn-4-ene-3:20-dione (10 g.), 90% phosphoric acid (1.042 g.) and triethylamine (2.975 ml.) were boiled under reflux for 2 hours in acetonitrile (100 ml.). More triethylamine (5.95 ml.) was added and the mixture boiled for a further 5 hours. Removal of solvent in vacuo left a brown froth, which was dissolved in ethanol (80 ml.) and water (20 ml.) and passed down a column of Zeo-Karb 225 (H+ form, 50 g.). An excess of aqueous N cyclohexylamine was gradually added to the eluate to keep it just alkaline. The column was eluted with aqueous alcohol until the eluate was no longer acid.

The di-(hydrocortisone 21-)cyclohexylammonium phosphate which separated from the neutralised eluate weighed 2.95 g. (31.5%) and had M.P. 215–216° (dec.), λ max. (in EtOH) 240 mμ

$E^{1\%}_{1\,cm.}$ 345

Removal of solvent from the mother-liquors and extraction of the residual gum with boiling acetone left a solid, which on recrystallization from aqueous acetone gave more of the diester salt in two crops 3.14 g. (33.6%), M.P. 215–216° (dec.) and 0.256 g. (2.7%), M.P. 214–216° (dec.). Recrystallisation from aqeous acetone gave the analytical sample of di-(hydrocortisone 21-)cyclohexylammonium phosphate as a dihydrate M.P. 215–216° (dec.), $[α]_D$+143.2° (c, 0.43 in 1:1 $EtOH:H_2O$).

(Found: C, 62.4; H, 8.3; N, 1.8; P, 3.6. $C_{48}H_{72}O_{12}PN \cdot 2H_2O$ requires C, 62.5; H, 8.3; N, 1.5; P, 3.4%), λ max. (EtOH)=241 mμ

$E^{1\%}_{1\,cm.}$ 346

(b) Di-(hydrocortisone 21-)sodium phosphate

Di-(hydrocortisone 21-)cyclohexylammonium phosphate (4.0 g.) dissolved by heating in ethanol (280 ml.) and water (70 ml.) and the cooled solution passed down a column of Zeo-Karb 225 (H+ form, 40 g.). The column was eluted with more aqueous alcohol until the eluate was no longer acid, and titrated with N sodium hydroxide (4.3 ml.) to pH 6. The solvent was removed in vacuo, finally at 0.1 mm., and the residual froth dissolved in industrial methylated spirit (250 ml.), filtered and evaporated to ca. 10 ml. Addition of acetone and evaporation gave the sodium salt in several crops (total yield 90%), M.P. ca. 225°. A solution of the solid (1.6 g.) in isopropanol (250 ml.) was concentrated to 5 ml., and acetone (150 ml.) was added to the suspension. On standing for several days the originally amorphous solid had turned into needles (1.31 g.) of di-(hydrocortisone 21-)sodium phosphate, M.P. 218–220°, $[α]_D$+172° (in $H_2O$).

(Found: C, 60.3; H, 7.45; P, 4.1. $C_{42}H_{58}O_{12}PNa \cdot H_2O$ requires C, 60.3; H, 7.2; P, 3.7%), λ max. (in $H_2O$) 248 mμ

$E^{1\%}_{1\,cm.}$ 370

EXAMPLE 13

(a) Di-(prednisolone 21-)cyclohexylammonium phosphate

11β:17α-dihydroxy-21-iodopregna-1:4-diene-3:20-dione (10 g.), 90% phosphoric acid (1.042 g.), and triethylamine (2.151 g.) were boiled under reflux for 2 hours in acetonitrile (100 ml.), and then a further quantity of triethylamine (5.95 ml.) was added. After a further 4 hours all the solid had dissolved, and after 5 hours the solvent was removed in vacuo and the residue taken up in water (20 ml.) and alcohol (80 ml.). The filtered solution was passed down a column of Zeo-Karb 225 (H⁺ form, 50 g.), and elution with aqueous alcohol was continued until the eluate was no longer acid. N cyclohexylamine (40 ml.) was added to the eluate during the elution at such a rate as to keep the solution at ca. pH 8. The bulky crystalline precipitate of di-(prednisolone 21-)cyclohexylammonium phosphate which formed was collected by filtration. It weighed 4.95 g. (53%), and had M.P. 209–216°, λ max. (in EtOH) 243 mμ.

$$E^{1\%}_{1\,cm.}\ 323$$

Removal of solvent from the mother-liquors left a gum, which was shaken in water (150 ml.) and the solid salt filtered. The solid was boiled with dry acetone to remove impurities, and recrystallised from aqueous acetone to give a further 2.63 g. of the bis-ester cyclohexylammonium salt in two crops. Total yield 70.4%.

Recrystallisation of the alcohol-precipitated salt (0.5 g.) from ca. 1:1 aqueous acetone gave di-(prednisolone 21-)cyclohexylammonium phosphate (0.39 g.), M.P. 210–216° (dec.), $[\alpha]_D+123°$ (c, 0.45 in 1:1 EtOH; H₂O).

(Found: C, 64.2; H, 8.1; N, 1.45; P, 3.8. $C_{48}H_{68}O_{12}PN.H_2O$ C, 64.1; H, 7.85; N, 1.6; P, 3.4%), λ max. (in EtOH) 242.5 mμ, $$E^{1\%}_{1\,cm.}\ 332$$

(b) *Di-(prednisolone 21-)sodium phosphate*

The cyclohexylammonium salt (2.5 g.) was dissolved by heating in alcohol (200 ml.) and water (50 ml.) was passed down a column of Zeo-Karb 225 (H⁺ form, 25 g.), and the column eluted with aqueous alcohol until the eluate was no longer acid. The eluate was titrated to pH 5.7 with N/10 sodium hydroxide (27.5 ml.), and the solvent removed in vacuo. The pale yellow residue failed to crystallise on addition of acetone (500 ml.) to a solution in water (5 ml.), so the solvent was again removed. The residue was taken up in boiling industrial methylated spirit (150 ml.), and on concentration to ca. 30 ml. di-(prednisolone 21-)sodium phosphate separated as needles (1.82 g., 80%), M.P. 226–227°, $[\alpha]_D+118°$ (c, 0.74 in H₂O).

(Found: C, 59.7; H, 7.1; P, 3.5. $C_{42}H_{54}O_{12}PNa.2H_2O$ requires C, 60.0; H, 6.95; P, 3.7%), λ max. (in H₂O) 246 mμ, $$E^{1\%}_{1\,cm.}\ 367$$

EXAMPLE 14

*Di-(prednisolone 21-)sodium phosphate*

11β:17α - dihydroxy - 21 - iodopregna - 1:4 - diene-3:20-dione (10.0 g.) was treated as in Example 13(a) but the acid eluate from the ion exchange was titrated to ca. pH 6 with N sodium hydroxide (27.2 ml.), rather than with cyclohexylamine. Removal of solvent then left a gum, which was boiled with dry acetone. The insoluble solid (6.1 g. 71%) was then recrystallised from ethanol to give di-(prednisolone 21-)sodium phosphate in two crops (3.288 g. and 0.769 g., total yield 47.5%) M.P. 227–228° $[\alpha]_D+129°$ (c, 0.42 in H₂O), λ max. (in H₂O) 246 mμ

$$E^{1\%}_{1\,cm.}\ 352$$

EXAMPLE 15

(a) *21-methanesulphonyloxy-5α-pregnane-3:20-dione*

Methanesulphonyl chloride (10.9 ml.) was added dropwise during 10 minutes to a stirred solution of 21-hydroxy-5α-pregnane-3:20-dione (10.9 g.) in pyridine (100 ml.) at 0–2°. After 20 minutes at 0° the solution was poured with stirring into ice and water (1500 ml.). The crystalline precipitate (13.1 g.; 97.4%), M.P. 122–140°, was collected by filtration and dried at 40° in vacuo. Recrystallisation from aqueous methanol then aqueous acetone gave the 21-methanesulphonate M.P. 132–136°, $[\alpha]_D+97.7°$ (c, 0.95 in CHCl₃).

(Found: C, 64.8; H, 8.0; S, 7.6. $C_{22}H_{34}O_5S$ requires C, 64.3; H, 8.3; S, 7.8.)

(b) *21-iodo-5α-pregnane-3:20-dione*

A solution of sodium iodide (5.0 g.) in acetone (150 ml.) was added to a solution of 21-methanesulphonyloxy-5α-pregnane-3:20-dione (5.0 g.) in acetone (150 ml.) and the mixture was boiled under reflux for 15 minutes, during which time sodium methanesulphonate separated. Removal of solvent in vacuo and addition of water containing a trace of sodium thiosulphate gave the 21-iodocompound (5.21 g., 96.5%), M.P. 140–144° (dec.).

(Found: C, 57.5; H, 7.0; I, 28.1. $C_{21}H_{31}O_2I$ requires C, 57.0; H, 7.1; I, 28.6%), after drying at 0.1 mm.

(c) *21-hydroxy-5α-pregnane-3:20-dione 21-disodium phosphate*

A solution of triethylamine (7.9 ml.) and 90% phosphoric acid (2.8 ml.) in acetonitrile (100 ml.) was added to a suspension of 21-iodo-5α-pregnane-3:20-dione (5.0 g.) in acetonitrile and the mixture boiled under reflux for 4 hours. The solvent was distilled from the solution in vacuo and the residual gum worked up to give the 21-disodium phosphate as a dihydrate (2.14 g.; 41.4%), M.P. 208–212°, $[\alpha]_D+82.5°$ (c, 0.87 in H₂O).

(Found: C, 51.8; H, 7.4; P, 6.7. $C_{21}H_{31}O_6PNa_2.2H_2O$ requires C, 51.2; H, 7.2; P, 6.3%) after drying to constant weight at 100°/0.1 mm.

EXAMPLE 16

(a) *21-methanesulphonyloxypregnane-3:20-dione*

21-hydroxypregnane-3:20-dione (15.4 g.) in pyridine (150 ml.) was treated with methanesulphonyl chloride (15.5 ml.) at 0–5°, and after 30 minutes the solution was poured into ice and water (2 l.). The precipitated gummy product was filtered off, dissolved in chloroform (250 ml.) and the chloroform solution was washed repeatedly with 2 N hydrochloric acid and water. Removal of solvent from the chloroform solution left a gum, which on recrystallisation from aqueous acetone (75 ml.) gave the 21-methanesulphonate (12.85 g.; 67.6%), M.P. 144–150°. Further crystallisation gave the analytical sample, M.P. 148–152°, $[\alpha]_D+96°$ (c, 0.94 in CHCl₃).

(Found: C, 64.8; H, 8.1; S, 7.7. $C_{22}H_{34}O_5S$ requires C, 64.3; H, 8.3; S, 7.8%.)

(b) *21-iodopregnane-3:20-dione*

21-methanesulphonyloxypregnane-3:20-dione (5.0 g.) was treated as described for the corresponding 5α-compound in Example 15(b), to give the 21-iodocompound (5.21 g., 96.6%), M.P. 113–117°, which after recrystallisation from aqueous acetone had M.P. 120–123°.

(Found: C, 57.2; H, 6.8; I, 28.6. $C_{21}H_{31}O_2I$ requires C, 57.0; H, 1.1; I, 28.7%.)

(c) *21-hydroxypregnane-3:20-dione 21-disodium phosphate*

21-iodopregnane-3:20-dione (5.0 g.) in acetonitrile (50 ml.) was added to a solution of triethylamine (8.0 ml.) and 90% phosphoric acid (2.8 ml.) in acetonitrile (50 ml.) and the mixture heated under reflux for 4 hours. The solvent was distilled in vacuo and the gummy residue worked up to give the 21-disodium phosphate as a dihydrate. (3.44 g., 66.8%), M.P. 180–185°, $[\alpha]_D+78°$ (c, 2.3 in H₂O).

(Found: C, 51.0; H, 6.95; P, 5.8. $C_{21}H_{31}O_6PNa_2.2H_2O$ requires C, 51.2; H, 7.16; P, 6.3%.)

EXAMPLE 17

*Hydrocortisone 21-disodium phosphate*

Phosphoric acid (90%; 10.0 ml.) was dissolved in isopropanol (25 ml.) and triethylamine (30 ml.) was added. A solid precipitated on cooling the solution but dissolved again on warming. Hydrocortisone iodide (5.0 g.) was added and the mixture refluxed. After 25 minutes a sample of the reaction mixture gave a clear solution in water and refluxing was discontinued. The solvent was evaporated under reduced pressure and on working up the product in methanol there was obtained hydrocortisone 21-disodium phosphate 4.54 g., λ max. 247 mμ

$$E_{1\,cm.}^{1\%}\ 309$$

$[\alpha]_D + 114°$ ($H_2O$).

We claim:

1. A process for the production of a 21-phosphate derivative of a steroid compound selected from the group consisting of pregnane and allopregnane compounds, comprising reacting, in an inert solvent having a dielectric constant of at least 15, the corresponding steroid compound containing in the 21-position a member selected from the group consisting of a halogen atom and a lower alkyl sulphonyloxy group with a salt of an organic base having a pKa of at least 7 in water and a phosphoric acid selected from the group consisting of orthophosphoric acid and partially esterified orthophosphoric acid.

2. The process of claim 1 in which said organic base is selected from the group consisting of isopropylamine, diethylamine, triethylamine, tri-n-propylamine, piperidine, N-methylmorpholine, N-ethylpiperidine and triethanolamine.

3. The process of claim 1 in which said phosphoric acid is orthophosphoric acid.

4. The process of claim 1 in which said phosphoric acid is monobenzyl orthophosphoric acid ester.

5. The process of claim 1 in which said phosphoric acid is dibenzyl orthophosphoric acid ester.

6. The process of claim 1 in which said inert solvent has a dielectric constant of at least 30.

7. The process of claim 1 in which said inert solvent is selected from the group consisting of acetonitrile, methanol, N:N-dimethyl formamide and dimethylsulphoxide.

8. The process of claim 1 in which the reaction is carried out at a temperature within the range of 50° to 130° C.

9. The process of claim 1 in which the steroid phosphate is isolated by evaporating off the solvent from the reaction medium, dissolving the residue in methanol, treating the resulting solution with methanolic alkali metal hydroxide, separating precipitated inorganic phosphate and evaporating the solution to dryness to yield the crude alkali metal salt of the steroid phosphate.

10. The process of claim 1 in which the starting steroid compound is 21-iodo-11β:17α-dihydroxypregn-4-ene-3:20-dione.

11. The process of claim 1 in which the starting steroid compound is 21-iodo-11β:17α-dihydroxypregna-1:4-diene-3:20-dione.

12. The process of claim 1 in which the starting steroid compound is hydrocortisone 21-methanesulphonate.

13. The process of claim 1 in which the starting steroid compound is 21-chloro - 11β:17α - dihydroxypregn-4-ene-3:20-dione.

14. The process of claim 1 in which the starting steroid compound is 21-bromo - 11β:17α - dihydroxypregn-4-ene-3:20-dione.

15. The process of claim 1 in which the starting steroid compound is 21-bromo-3β:17α-dihydroxy - 5α - pregnane-11:20-dione.

16. The process of claim 1 in which the starting steroid compound is 17α-hydroxy-21-iodopregna-1:4-diene-3:11:20-trione.

17. The process of claim 1 in which the starting steroid compound is 21-methanesulphonyloxy-5α-pregnane-3:20-dione.

18. The process of claim 1 in which the starting steroid compound is 21-iodo-5α-pregnane-3:20-dione.

19. The process of claim 1 in which the starting steroid compound is 21 - methanesulphonyloxypregnane - 3:20-dione.

20. The process of claim 1 in which the starting steroid compound is 21-iodopregnane-3:20-dione.

References Cited in the file of this patent

UNITED STATES PATENTS

| | | |
|---|---|---|
| 2,357,224 | Reichstein | Aug. 29, 1944 |
| 2,779,775 | Sarett | Jan. 29, 1957 |
| 2,789,117 | Sarett | Apr. 16, 1957 |